(12) United States Patent
Bischoff et al.

(10) Patent No.: US 11,550,272 B2
(45) Date of Patent: Jan. 10, 2023

(54) METHOD AND DEVICE FOR SETTING AT LEAST ONE PARAMETER OF AN ACTUATOR CONTROL SYSTEM AND ACTUATOR CONTROL SYSTEM

(71) Applicant: ROBERT BOSCH GMBH, Stuttgart (DE)

(72) Inventors: Bastian Bischoff, Esslingen (DE); Julia Vinogradska, Stuttgart (DE); Jan Peters, Darmstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 204 days.

(21) Appl. No.: 16/757,278

(22) PCT Filed: Aug. 10, 2018

(86) PCT No.: PCT/EP2018/071742
§ 371 (c)(1),
(2) Date: Apr. 17, 2020

(87) PCT Pub. No.: WO2019/076511
PCT Pub. Date: Apr. 25, 2019

(65) Prior Publication Data
US 2021/0191347 A1   Jun. 24, 2021

(30) Foreign Application Priority Data

Oct. 20, 2017   (DE) ..................... 10 2017 218 813.8

(51) Int. Cl.
*G05B 13/04*       (2006.01)
*G06N 20/00*       (2019.01)
(Continued)

(52) U.S. Cl.
CPC ....... *G05B 13/042* (2013.01); *G05B 13/0265* (2013.01); *G06N 7/005* (2013.01); *G06N 20/00* (2019.01)

(58) Field of Classification Search
CPC .. G05B 13/042; G05B 13/0265; G06N 7/005; G06N 20/00
See application file for complete search history.

(56) References Cited

U.S. PATENT DOCUMENTS

2004/0024750 A1*  2/2004  Ulyanov ................ B82Y 10/00
2004/0198268 A1* 10/2004  Rashev ................ H03F 1/0277
                                                           455/115.1
(Continued)

FOREIGN PATENT DOCUMENTS

DE    102013212889 A1 *  1/2015  ............. G05B 13/04
DE    102013212889 A1     1/2015
(Continued)

OTHER PUBLICATIONS

International Search Report and Written Opinion dated Nov. 7, 2018 in international patent application No. PCT/EP2018/071742, 9 pages.
(Continued)

*Primary Examiner* — Michael W Choi
(74) *Attorney, Agent, or Firm* — Blueshift IP, LLC; Robert Plotkin (57) ABSTRACT

The invention relates to a method for automatically setting at least one parameter of an actuator control system which is designed to control a control variable of an actuator to a predefinable setpoint. The actuator control system is designed to generate a control variable depending on the at least one parameter, the setpoint and the control variable and to actuate the actuator depending on this control variable. A new value of the at least one parameter is determined depending on a stationary probability distribution of the
(Continued)

control variable, and the parameter is then set to this new value.

16 Claims, 6 Drawing Sheets

(51) Int. Cl.
*G05B 13/02* (2006.01)
*G06N 7/00* (2006.01)

(56) References Cited

U.S. PATENT DOCUMENTS

2009/0125274 A1* 5/2009 Waldock .............. G05B 13/024
702/181
2017/0200089 A1* 7/2017 Huang ................... G16H 70/60

FOREIGN PATENT DOCUMENTS

DE 102017211209 A1 1/2019
EP 3062176 A2 8/2016

OTHER PUBLICATIONS

Tom Erez et al., "Infinite-Horizon Model Predictive Control for Periodic Tasks with Contacts," Robotics: Science and Systems VIII, Jun. 27, 2011, 8 pages. DOI: 10.15607/RSS.2011.VIII.010, ISBN: 978-0-262-51770-9. XP055512502.

* cited by examiner

METHOD AND DEVICE FOR SETTING AT LEAST ONE PARAMETER OF AN ACTUATOR CONTROL SYSTEM AND ACTUATOR CONTROL SYSTEM

The invention relates to a method for automatically setting at least one parameter of an actuator control system, a computer program and a learning system for carrying out the method, a machine-readable storage medium on which the computer program is stored, and an actuator control system of which the parameters are set using said method.

PRIOR ART

From DE 10 2017 211 209, which is not a previously published document, a method is known for automatically setting at least one parameter of an actuator control system which is designed to control a control variable of an actuator to a predefinable target variable, the actuator control system being designed to generate a manipulated variable depending on the at least one parameter, the target variable and the control variable, and to actuate the actuator depending on said manipulated variable, a new value of the at least one parameter being selected depending on a long-term cost function, said long-term cost function being determined depending on a predicted temporal evolution of a probability distribution of the control variable of the actuator, and the parameter then being set to this new value.

Advantage of the Invention

The method having the features of independent claim 1 nevertheless has the advantage that it makes optimal setting of the actuator control system that has an unlimited temporal horizon of the control possible. Advantageous developments are the subject matter of the independent claims.

DISCLOSURE OF THE INVENTION

In a first aspect, the invention relates to a method for automatically setting at least one parameter of an actuator control system for controlling a control variable of an actuator to a predefinable target variable, the actuator control system being designed to generate a manipulated variable depending on the at least one parameter, the target variable and the control variable and to actuate the actuator depending on said manipulated variable, a new value of the at least one parameter being selected depending on a stationary probability distribution of the control variable, and the parameter then being set to said new value.

The stationary probability distribution is in this case the probability distribution toward which a probability distribution of the control variable converges during sustained use of a control strategy of the actuator control system that depends on the parameter. According to the invention, it has been specifically recognized that said stationary probability distribution for many systems which comprise an actuator and an actuator control system according to the invention exists largely independently of the initial requirements and is obvious.

It therefore becomes possible to also optimise the control strategy if no limitation of a temporal horizon of the control is to be predefined.

A model is provided in an advantageous development. Said model can in particular be a Gaussian process, advantageously a sparse Gaussian process. The stationary probability distribution is then determined using this model. This causes the method to be particularly efficient.

In a development of this aspect the model can be adapted depending on the manipulated variable which is supplied to the actuator when the actuator control system controls the actuator. The model is also adapted depending on the control variable which results therefrom. "Adaptation of the model" can be understood in this case as meaning that model parameters which characterise the behaviour of the model are adapted.

After the model has been adapted, an (optimal) new value of the at least one parameter is redetermined depending on the stationary probability distribution of the control variable of the actuator (and the parameter is then reset to this new value). The redetermination of the new value of the at least one parameter is in this case determined depending on the now adapted model.

That is to say, in this development an episodic approach is provided in which the model is first improved (by the behaviour of the real actuator being observed when the real actuator is controlled by the actuator control system). The actuator control system is then improved by the parameters which characterise the control strategy of the actuator control system being optimized by the model during simulation of the reaction of the actuator. This sequence of improving the model and adapting the parameters can be repeated multiple times.

This procedure has the advantage that the model and the actuator control system are successively improved, therefore resulting in a particularly good adaptation of the actuator control system.

In a further particularly advantageous aspect, the stationary probability distribution of the control variable can be determined by an approximation of an integration using possible values of the control variable, said approximation being carried out using numerical quadrature. "Numerical quadrature" in this case refers to an approximation method which approximates the integral by evaluating the integrands at support points and support weights which are associated with the support points.

The stationary probability distribution can in this case be determined by means of a (Gaussian) process which has one or more time steps. At each fixed state of a time step, the Gaussian process in this case models a probability distribution having an associated average value and associated variance of the subsequent state (i.e., of the state at the next time step).

The use of the numeric quadrature has the advantage, in particular in conjunction with the use of Gaussian processes, that the solution is numerically particularly simple, the precision of the approximation being very good at the same time, such that the actuator control system generated in this way is particularly efficient.

In an advantageous development, a density of the support points is determined depending on a determined temporal evolution of the control variable, that in particular is determined by means of the model and/or the actuator control system, proceeding from an initial value of the control variable that was (pseudo-)randomly determined from an initial probability distribution, i.e., in this case the initial value is "sampled", in particular from the initial probability distribution. A temporal evolution (i.e., a trajectory in the state space) of the control variable is therefore determined, at the starting point of which the control variable assumes the randomly determined initial value. The density of the support points is then selected depending on this temporal evolution. This leads to an efficient selection of the support points, since actual trajectories of the control variable influence the selection of the support points with adequate probability. In particular it can therefore be ensured that the method also functions reliably when the parameter of the actuator control system is not yet well adapted.

In one development, the density of support points can also be determined proceeding from the target value as an initial value of the control variable, depending on a determined temporal evolution of the control variable that is in particular determined by means of the model and/or the actuator control system. This has the advantage that the support points are selected particularly efficiently, since when the method converges it can be assumed that an actual trajectory of the control variable is close to a trajectory on which the control variable assumes the target value.

Specifically, the density of the support points can be selected depending on a variable which characterizes a smoothness of the model at at least one value of the control variable in the determined temporal evolution(s) of the control variable. Formulated more precisely, the expression "smoothness of the model" can be understood to mean the smoothness of the model prediction, i.e., the smoothness of a probability distribution predicted for the subsequent following time step. A low level of smoothness of the model means in this case that greater differences can be expected between successive time steps in the temporal evolutions than in cases in which the smoothness of the model has a higher value.

This variable which characterizes the smoothness of the model can in particular be a variance of the Gaussian process, which variance is associated with at least one of the values which the control variable assumes in the determined temporal evolution(s). The greater said variance is, the lower the level of smoothness of the model.

In this manner it can be ensured that the selection of the support points is selected such that an error of the approximation, in particular of the numerical quadrature, becomes particularly small.

In order to carry this out in an optimum manner, the density of the support points in a region can be selected depending on a smallest value, said smallest value being a minimum value of the variables which characterize a smoothness of the model at the values of the control variable which are in this range. That is to say, one or more temporal evolutions of the control variable are determined as a discrete sequence of values which the control variable assumes. Of the discrete sequence of values, only those values that are in the aforementioned range are then considered. A variable is associated with each of these values, which variable characterizes the smoothness of the model at this point. The smallest value is selected from these associated values.

The density of support points in a region can also alternatively or additionally be selected depending on an average density of support points in said region. In particular, the density of support points can be increased when a quotient of an average density of support points and the smallest value falls below a predefinable threshold value, in particular the value 1. A method of this kind is particularly simple to implement.

An increase of the average density of support points can be achieved by reducing a volume element to which a rule for generating support points is applied, for example by dividing a present volume element into a plurality of smaller volume elements, and then generating for each of these smaller volume elements by means of the rule for generating support points.

In a further aspect, a result of the numerical quadrature can be determined depending on a dominant eigenvector of a matrix which is given by a product of a diagonal matrix of support weights and a transition matrix, the components of the transition matrix each characterizing a probability of a transition of the control variable from a first support point to a second support point.

This has the advantage that it is particularly efficient to determine the dominant eigenvector as a threshold value of an operation, on the basis of a repeated matrix multiplication. In this case the function which describes the probability density only has to be evaluated once at each support point. This method can be parallelized particularly well and is therefore particularly efficient to carry out on one or more GPUs.

In a further aspect of the invention, the long-term cost function can be selected depending on a local cost function, the local cost function being selected depending on a Gaussian function and/or a polynomial function which is dependent on a difference between the manipulated variable and the predefinable target value. The cost function can, for example, be selected as a linear combination of the Gaussian function and polynomial function. Selecting the cost function in this manner is particularly simple.

In another further aspect, the manipulated variable can advantageously be limited by means of a limiting function to values within a predefinable manipulated variable range. This allows the manipulated variable to be limited in a particularly simple manner.

In further aspects, the invention relates to a learning system for automatically setting at least one parameter of an actuator control system which is designed to control a control variable of an actuator to a predefinable target variable, the learning system being designed to carry out one of the aforementioned methods.

As mentioned, aspects of the method can be carried out particularly efficiently on one or more GPUs. The learning system can therefore advantageously comprise one or more GPUs for carrying out the method.

Embodiments of the invention are described below in greater detail and with reference to the accompanying drawings, in which.

DESCRIPTION OF THE EMBODIMENTS

Figure 1:
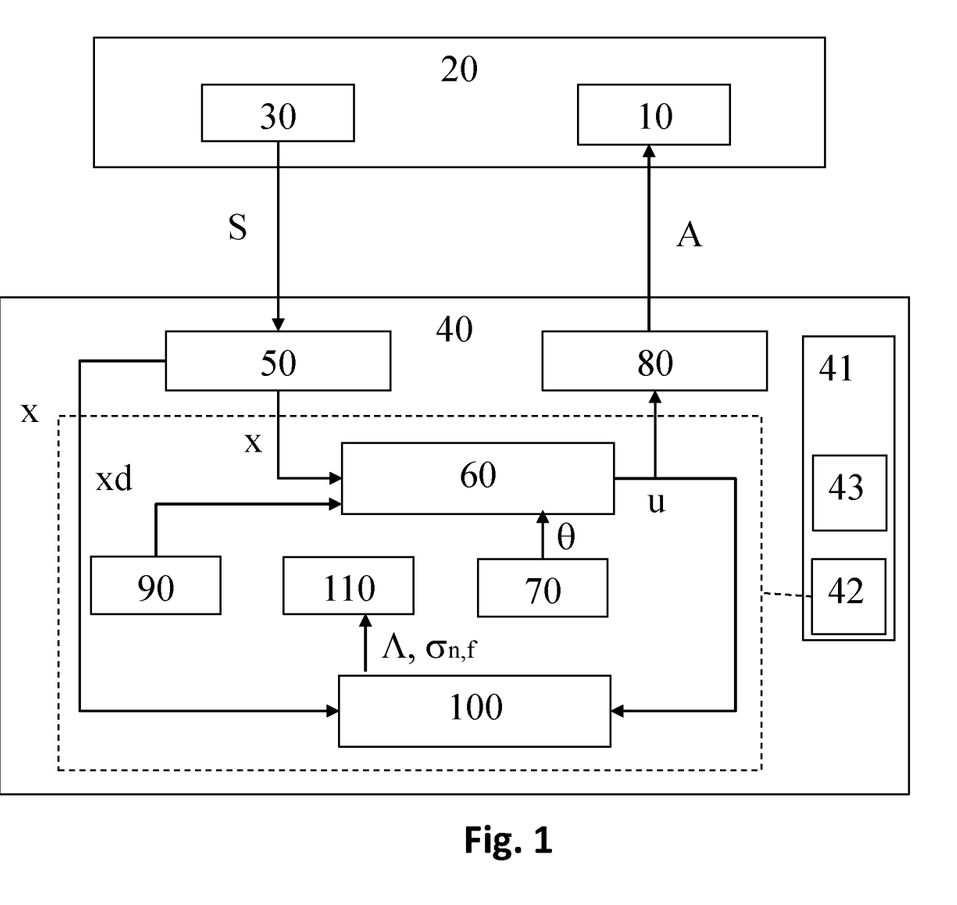
FIG. 1 schematically shows an interaction between the learning system and the actuator.

FIG. 1 shows the actuator 10 in the surroundings 20 thereof, in interaction with the learning system 40. The actuator 10 and surroundings 20 are subsequently also jointly referred to as the actuator system. A state of the actuator system is detected using a sensor 30, which can also be provided using a plurality of sensors. An output signal S of the sensor 30 is transmitted to the learning system 40. From said signal, the learning system 40 determines a control signal A which the actuator 10 receives.

The actuator 10 can be, for example, a (partially) autonomous robot, for example a (partially) autonomous motor vehicle or a (partially) autonomous lawnmower. It can also be an actuation means of an actuating member of a motor vehicle, for example a throttle valve or a bypass actuator for idling control. It can also be a heating system or a part of a heating system, such as a valve actuator. The actuator 10 can in particular be larger systems, such as a combustion engine or an (optionally hybridized) drive train of a motor vehicle, for example, or also a braking system.

The sensor 30 can be, for example, one or more video sensors and/or one or more radar sensors and/or one or more ultrasound sensors and/or one or more position sensors (for example GPS). Other sensors are also conceivable, for example a temperature sensor.

In another embodiment the actuator 10 can be a manufacturing robot, and the sensor can be an optical sensor 30, for example, which detects the properties of manufactured articles of the manufacturing robot.

The learning system 40 receives the output signal S from the sensor in an optional receiving unit 50 which converts the output signal S into a control variable x (alternatively, the output signal S can also be directly adopted as the control variable x). The control variable x can be a portion or further processing of the output signal S, for example. The control variable x is supplied to a controller 60, in which a control strategy π is implemented.

Parameters θ which are supplied to the controller 60 are stored in a parameter memory 70. The parameters θ parameterize the control strategy π. The parameters θ can be a singular parameter or a plurality of parameters.

A block 90 supplies the predefinable target variable xd to the controller 60. The block 90 can generate the predefinable target variable xd, for example depending on a sensor signal that is predefined to the block 90. It is also possible that the block 90 reads out the target variable xd from a dedicated storage region in which the variable is stored.

Depending on the control strategy π(θ) (and therefore depending on the parameters θ) of the target variable xd and the control variable x, the controller 60 generates a manipulated variable u. This manipulated variable can for example be determined depending on a difference x-xd between the control variable x and the target variable xd.

The controller 60 transmits the manipulated variable u to an output unit 80 which determines the control signal A from said variable. It is possible, for example, that the output unit first checks whether the manipulated variable u is in a predefinable value range. If this is the case, the control signal A is determined depending on the manipulated variable u, for example, by an associated control signal A being read out from a characteristic diagram depending on the manipulated variable u. This is the norm. If it is determined, however, that the manipulated variable u is not in the predefinable value range, the control signal A can therefore be designed such that it switches the actuator A into a protected mode.

The receiving unit 50 transmits the control variable x to a block 100. The controller 60 also transmits the corresponding manipulated variable u to the block 100. The block 100 stores the time series of the control variable x, which is received at a sequence of time points, and of the relevant corresponding manipulated variable u. The block 100 can then adapt model parameters $\Lambda$, $\sigma_n$, $\sigma_f$ of the model g depending on said time series. The model parameters $\Lambda$, $\sigma_n$, $\sigma_f$ are supplied to a block 110 which, for example, stores said parameters in a dedicated storage region. This is described below in FIG. 4, step 1030.

The learning system 40 comprises, in one embodiment, a computer 41 which has a machine-readable storage medium 42 on which a computer program is stored that, when carried out by the computer 41, prompts the computer to carry out the described functions of the learning system 40. In the embodiment, the computer 41 comprises a GPU 43.

The model g can be used to optimize the parameters θ of the control strategy π. This is illustrated schematically in FIG. 2.

Figure 2:
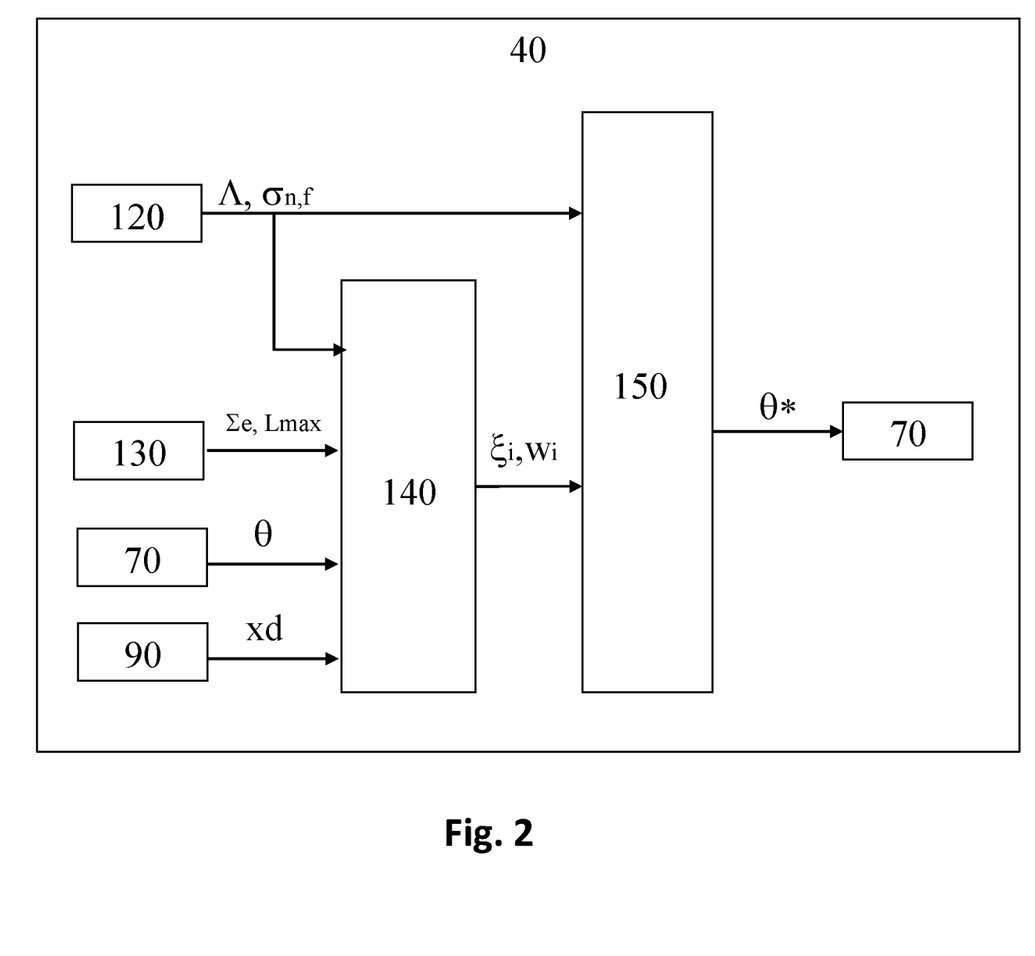
FIG. 2 schematically shows a structure of parts of the learning system.

The block 120 transmits the model parameters $\Lambda$, $\sigma_n$, $\sigma_f$ to a block 140 and a block 150. A block 130 determines a noise variance $\tau_\in$, and a maximum partitioning depth Lmax (for example by these values being predefined and being read out from dedicated storage regions in the memory), and transmits them to the block 140. The parameter memory 70 transmits parameters θ to the block 140, and the block 90 transmits the target value xd to the block 140.

Figure 6:
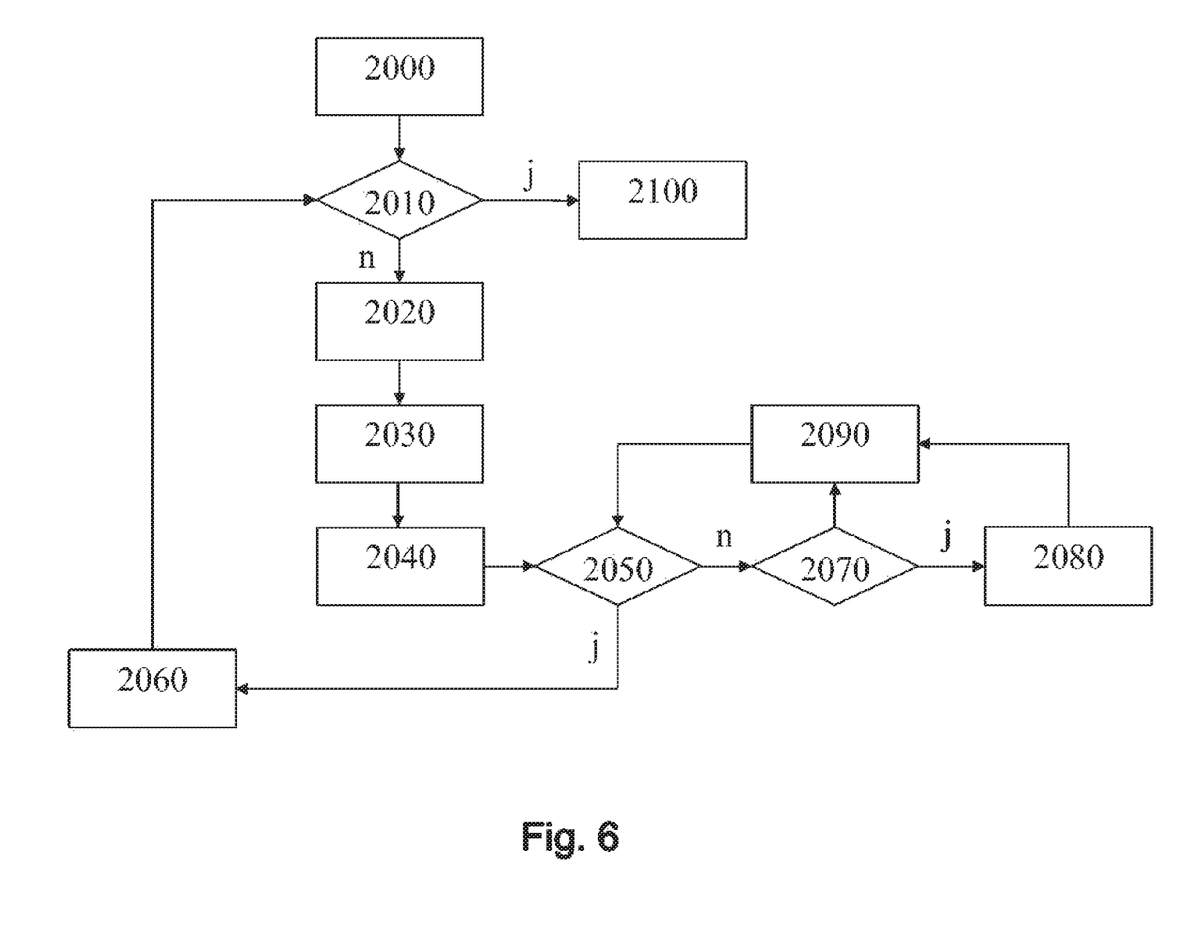
FIG. 6 schematically shows in a flowchart an embodiment of the method for determining the support points.

The block 140 determines support points $\xi_i$ and associated support weights $w_i$ from said values. One embodiment of the algorithm of said determination is illustrated in FIG. 6. The determined support points $\xi_i$ and associated support weights $w_i$ are conveyed to the Block 150.

The block 150 determines new parameters θ* from said points and weights. This is described in FIG. 4, step 1050. The new parameters θ* are conveyed to the parameter memory 70, where the values of the parameters θ are replaced with the respective corresponding values of the new parameters θ*.

The blocks shown in FIG. 2 can be part of the learning system 40, and there, as described in conjunction with FIG. 1, the blocks can be implemented as part of a computer program and stored on the machine-readable storage medium 42.

Figure 3:
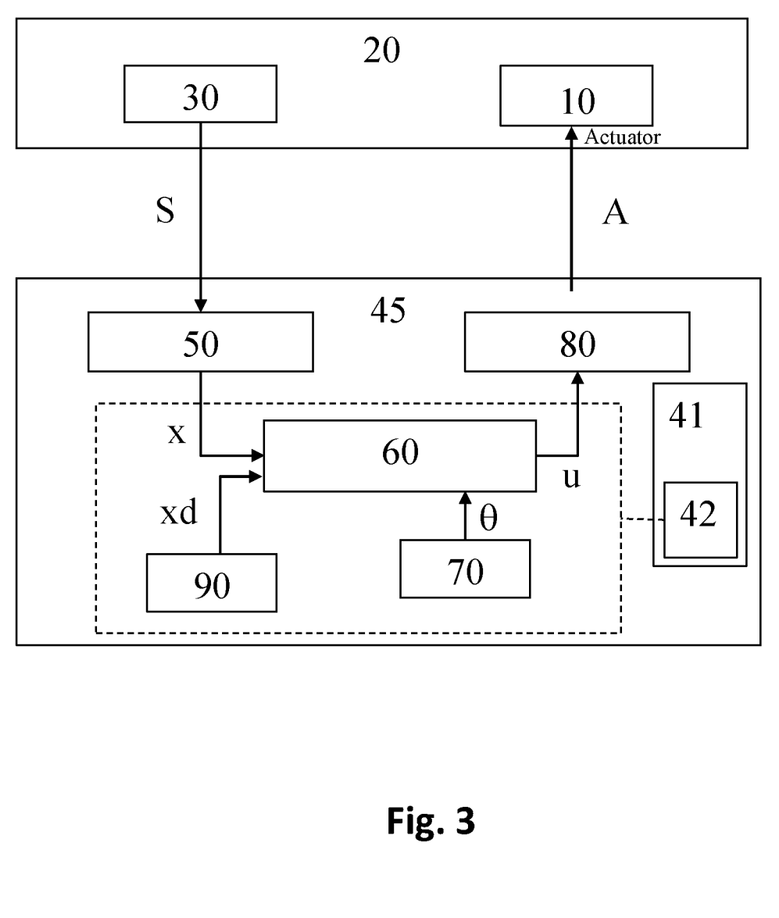
FIG. 3 schematically shows an interaction between the actuator control system and the actuator.

FIG. 3 illustrates the interaction of the actuator control system 45 with the actuator 10. The structure of the actuator control system 45 and the interaction thereof with the actuator 10 and the sensor 30 is largely the same as the structure of the learning system 40, for which reason only the differences are described here. In contrast to the learning system 40, the actuator control system 45 does not have a block 100 and also does not have a block 110. The transmission of variables to the block 100 is therefore not applicable. Parameters θ which have been determined using the method according to the invention, as illustrated in FIG. 4 for example, are stored in the parameter memory 70 of the actuator control system 45.

Figure 4:
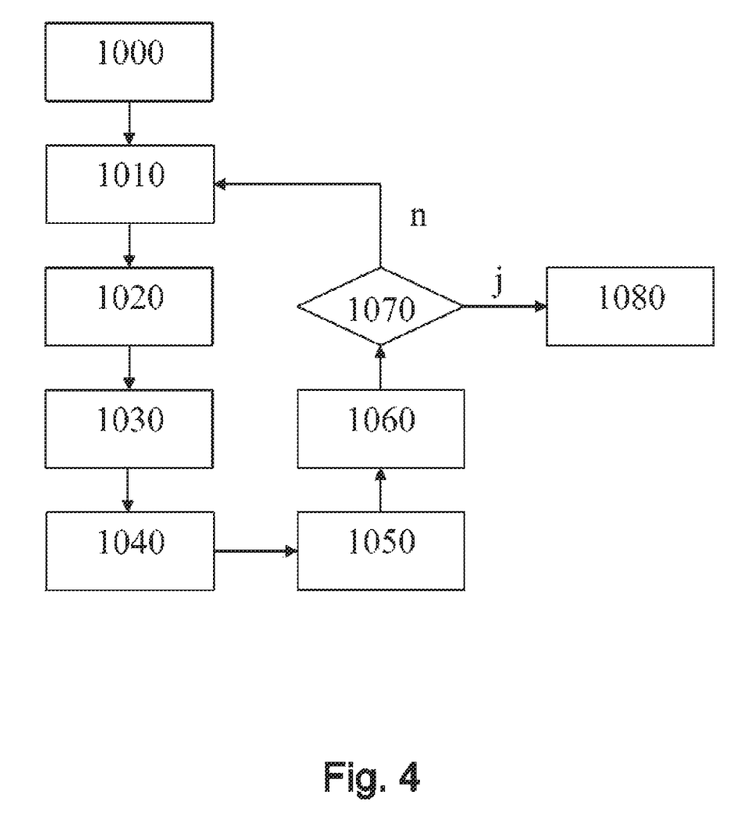
FIG. 4 schematically shows in a flowchart an embodiment of the method for training the actuator control system.

FIG. 4 illustrates an embodiment of the method according to the invention. Firstly (1000), the parameters θ are set at initial values. In this case the parameters θ can be randomly initialized, but they can also be fixedly predefined.

The controller 60 then (1010) generates manipulated variables u depending on the control strategy π(θ), as described in FIG. 1, using which variables the actuator 10 is controlled, as described in FIG. 1. The actuator 10 interacts with the sensor 30 via the surroundings 20, of which sensor the sensor signal S is directly or indirectly received as a control variable x by the controller 60.

The block 100 receives and aggregates (1020) the time series of the manipulated variable u and control variable x which together in each case form a pair z comprising a control variable x and a manipulated variable x, $z=(x^1, \ldots, x^D, u^1 \ldots u^F)^T$.

In this case D is the dimensionality of the control variable x, and F is the dimensionality of the manipulated variable u, i.e., $x \in \mathbb{R}^D$, $u \in \mathbb{R}^F$.

Depending on this state trajectory, a Gaussian process g is then (1030) adapted such that between successive time points t, t+1 the following applies:

$$x_{t+1} = x_t + g(x_t, u_t). \tag{1}$$

In this case $$u_t = \pi_\theta(x_t). \tag{1'}$$

A covariance function k of the Gaussian process g is, for example, given by $$k(z,w) = \sigma_f^2 \exp(-\tfrac{1}{2}(z-w)^T \Lambda^{-1}(z-w)). \tag{2}$$

The parameter $\sigma_f^2$ is in this case a signal variance, and $\Lambda = \text{diag}(l_1^2 \ldots l_{D+F}^2)$ is a collection of squared length scales $l_1^2 \ldots l_{D+F}^2$ for each of the D+F input dimensions.

A covariance matrix K is defined by $$K(Z,Z)_{i,j} = k(z^i, z^j). \tag{3}$$

The Gaussian process g is then characterized by two functions: by an average value $\mu$ and a variance Var which are given by $$\mu(z_*) = k(z_*, Z)(K(Z,Z) + \sigma_n^2 I)^{-1} y, \tag{4}$$

$$\text{Var}(z_*) = k(z_*, z_*) - k(z_*, Z)(K(Z,Z) + \sigma_n^2 I)^{-1} k(Z, z_*). \tag{5}$$

y is in this case given in the usual manner by $y^i = f(z^i) + \in^i$, with white noise being $\in^i$.

The parameters $\Lambda$, $\sigma_n$, $\sigma_f$ are then adapted to the pair $(z^i, y^i)$ in the known manner, by a logarithmic marginal likelihood-function being maximized.

Support points $\xi_i$ and associated support weights $w_i$ are then (1040) determined (as described in FIG. 6 for example). The initial vector $a_0$ which has N components is, for example, initialized to a randomly selected value and normalized to a length of 1.

Figure 5:
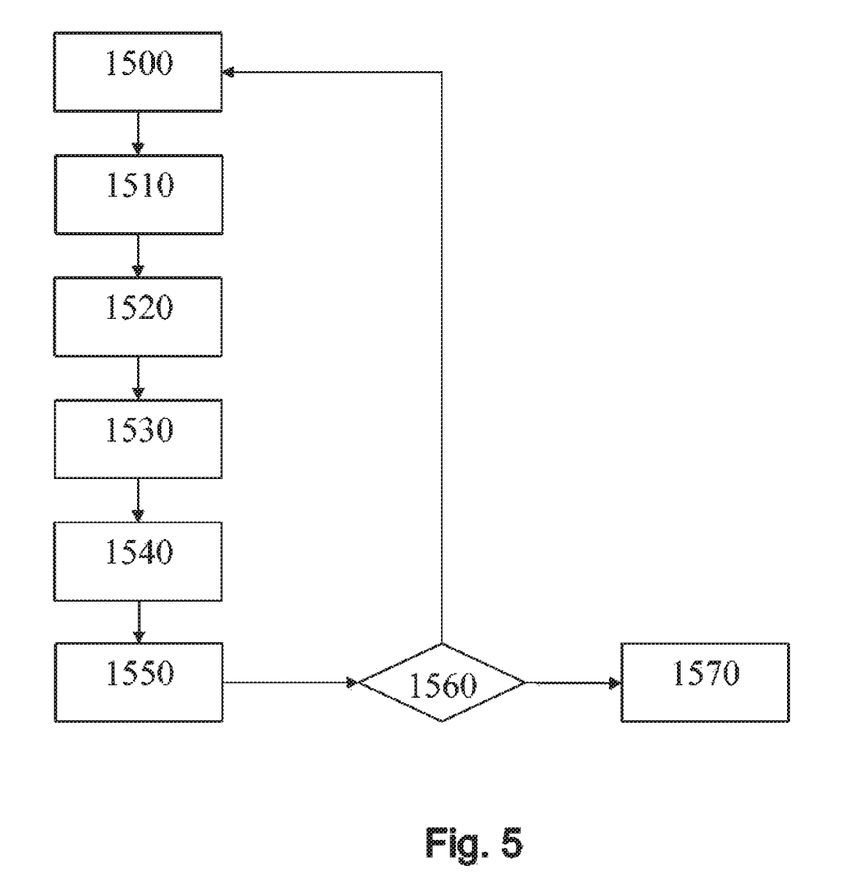
FIG. 5 schematically shows in a flowchart an embodiment of the method for determining the new optimal parameter.

A new optimal parameter $\theta^*$ is then (1050) determined (as described in FIG. 5 for example).

The new optimal parameter $\theta^*$ which is determined in this manner at least approximately solves the equation $$\theta^* = \max_\theta R_\pi^\infty(\theta) = \max_\theta \int r(x) p_{*,\theta}(x) dx. \tag{6}$$

In this case $p_{*,\theta}$ denotes a stationary probability distribution toward which the system (illustrated in FIG. 1) of continued use of the control strategy $\pi_\theta$ converges, $r(x)$ denotes a local cost function which can be defined by a characteristic diagram or a mathematic function, for example.

The solution of equation (6) requires a solution to the equation $$p_{*,\theta}(x_{t+1}) = \int p(x_{t+1} | x_t, \pi_\theta(x_t)) p_{*,\theta}(x_t) dx_t. \tag{7}$$

Due to the form of the integral kernel, this equation cannot be solved in a closed form.

The solution of this equation therefore has to be achieved by numeric approximation methods. This requires a sufficient precision be achieved without becoming computationally intensive. As a result, the method described in FIG. 5 corresponds to a numeric quadrature with the support points $\xi_i$ and associated support weights $w_i$ using $$P_{*,\theta}(x_{t+1}) \approx \Sigma_{i=1}^N w_i \cdot p(x_{t+1} | x_t = \xi_i, \pi(x_t = \xi_i)) p_{*,\theta}(\xi_i) \tag{8}$$

and surprisingly achieves this aim.

The parameter $\theta$ is then (1060) replaced with the new parameter $\theta^*$.

It is then (1070) optionally checked whether the method of determining the parameter $\theta$ has converged. If this is not the case ("n") there is a jump back to step 1010. If this is the case ("j"), however, optimal parameters $\theta$ have been found and the method is completed (1080). The method can naturally also be completed after a single iteration.

FIG. 5 illustrates the method for determining the new optimal parameter $\theta^*$ according to a possible embodiment.

First (1500), basic functions $\phi_i(x)$ are determined as $\phi_i = g(\xi_i, \pi_\theta(\xi_i))$ for each value of the index variables $i = 1 \ldots N$ by means of the Gaussian process g and the support points $\xi_i$. Matrix entries $\Phi_{i,j} = \phi_j(\xi_i)$ are then determined for all index variables $i,j = 1 \ldots N$. That is to say, the matrix entries $\Phi_{i,j}$ together form a transition matrix $(\Phi)$, each matrix entry $\Phi_{i,j}$ characterizing each probability given during Gaussian process g, such that the control variable x transitions from state $x = \xi_j$ into state $x = \xi_i$.

Now (1510) the matrix $$M = \text{diag}(w) \Phi \tag{8}$$

is determined by $$\text{diag}(w)_{i,j} = w_i \delta_{i,j}.$$

In this case the columns can also be normalized by replacing the entries of the matrix $M_{i,j}$ with $M_{i,j} / \Sigma_{k=1}^N w_k \phi_j(\xi_i)$.

Proceeding from the initial vector $\alpha_0$ the weight vectors $\alpha_1, \alpha_2 \ldots$ are then (1520) iteratively generated using $$\alpha_{t+1} = M \alpha_t, \tag{9}$$

and are generated until the weight vectors which are generated in this manner converge, i.e., meet a predefinable convergence criteria, for example $\|\alpha_{t+1} - \alpha_t\| < \in$ for a fixedly predefinable value $\in$. The weight vector $\alpha_{t+1}$ which was last generated is the dominant eigenvector $\alpha_\theta^\infty$ of the matrix M defined in the equation (8).

It has been specifically recognized that the matrix M is positive and stochastic ("stochastic" in this context meaning that the elements of each line summate to the value one), and that according to the Perron-Frobenius theorem exactly one eigenvector exists for a largest possible eigenvalue $\lambda = 1$, such that the described method (in terms of numerical precision) always clearly converges.

The dominant eigenvector $\alpha_\theta^\infty$ therefore characterizes by means of $p_{*,\theta}(x) \approx \Phi^T \alpha_\theta^\infty$, i.e., the eigenvector characterizes the representation of the stationary probability distribution $p_{*,\theta}$ by means of the basic functions $\phi_i(x)$.

As the dominant eigenvector of the positive matrix M, $\alpha_\theta^\infty$ can be differentiated by means of the parameters $\theta$ which parameterize the matrix M. A partial derivative $$\frac{\partial \alpha_\theta^\infty}{\partial \theta}$$

is therefore now (1540) estimated. This can, for example, be achieved by determining the corresponding dominant eigenvector $\alpha_{\theta_\Delta}^\infty$ for various parameters $\theta_\Delta$ in the region of the parameter $\theta$ by means of steps (1500)-(1520), and estimating the partial derivative using differences, for example according to $$\frac{\partial \alpha_\theta^\infty}{\partial \theta} = \frac{\alpha_{\theta_\Delta}^\infty - \alpha_\theta^\infty}{\theta - \theta_\Delta}$$

The initial vector $\alpha_0$ can be set equal to the dominant eigenvector $\alpha_\theta^\infty$ before step (1540), optionally in one step (1530), in order to improve convergence.

A gradient ascent method is then (1550) preferably used in order to vary $\theta$ in the direction of the parameter $\theta$ in the direction of a maximum value of $R_\pi^\infty(\theta)$ according to formula (6), using the determined estimated value of the partial derivative $$\frac{\partial \alpha_\theta^\infty}{\partial \theta}$$

of the dominant eigenvector $\alpha_\theta^\infty$. This is preferably carried out by means of the approximate equation $$R_\pi^\infty(\theta) \approx \Sigma_{i=1}^N \alpha_{i,\theta}^\infty \mathbb{E}_{x \sim \phi_i}[r(x)], \quad (10)$$

where $\alpha_{i,\theta}^\infty$ denotes the components of the dominant eigenvector $\alpha_\theta^\infty$.

It is then (1560) checked whether the method for determining the parameter $\theta$ has converged, for example, by checking whether the change of the parameter $\theta$ in step (1550) has fallen below a predefinable threshold value. If this is the case the method (1570) is completed. Otherwise, a new iteration begins in step (1500).

FIG. 6 illustrates the method for determining the support points $\xi_i$ and the associated support weights $w_i$.

A partitioning of a state space X of all possible values of the control variable is first initialized. The partitioning can initially be selected as the trivial partitioning of the state space X, for example, i.e., the state space X is not divided, but is given by the whole state space X.

A counter s is initialized to the value s=1. The support points $\xi_i$ are determined for the state space X according to a numerical quadrature rule (such as Kepler's barrel rule, the trapezoidal rule, Simpson's rule or the Gaussian quadrature, for example), so too are the associated support weights $w_i$.

It is then (2010) checked whether the counters has reached the maximum partitioning depth Lmax. If this is the case the method is completed (2100) in the step.

Otherwise, the target value xd is assumed as value $\tau_0'$ for the control variable x, and a temporal evolution $\tau_0', \tau_1' \ldots \tau_T'$ is determined (2020) using formula (1), (1').

A further value $\tau_0$ is then optionally also randomly selected for the control variable x according to the initial probability distribution $p(x_0)$, and a further temporal evolution $\tau_0, \tau_1, \ldots \tau_T$ is determined (2030) analogously to step 2020 using formula (1), (1').

A further counter l is then (2040) initialized to the value l=1, and it is checked (2050) whether the further counter l has reached the value of the counter s. If this is the case, step 2060 follows, in which the counter s is incremented by one, and there is a jump back to step 2010. If this is not the case, the variable $\rho_l(\tau)$ is determined (2070) which characterizes whether the density of the support points $\xi_i$ is adequate. The density can be determined, for example, to $$\rho_l(\tau) = \frac{vol(X_l)}{N_l \min_{\tau_l, \tau_l' \in X_l} Var(\tau_l)}. \quad (11)$$

In this case $X_l$ is the I-th partial volume element of the partitioning of the state space X, $Vol(X_l)$ is the volume thereof and $N_l$ is the number of support points $\xi_i$ therein. It is then checked (2070) whether this variable is $\rho_l(\tau)<1$, other threshold values than the value "1" also being possible.

If this is the case ("j"), a partial volume element $X_l$ is split (2080) into a plurality of smaller partial volume elements, for example, by the partial volume element $X_l$ being halved along one or along all of the dimensions thereof. The support points $\xi_i$, which are associated with the partial volume element $X_l$ and associated support weights $w_i$ are then removed, and support points $\xi_i$ and associated support weights $w_i$ are added for each of the smaller, newly generated partial volume elements. Step 2090 then follows, in which the further counter l is incremented by one. There is then a jump back to step 2050.

If the check in step 2070 reveals that the requirement has not been met ("n"), step 2090 follows immediately.

The invention claimed is:

1. A method for automatically setting at least one parameter of an actuator control system which is designed to control a control variable of an actuator to a predefined target variable, wherein the actuator control system is designed to generate a manipulated variable (u) depending on the at least one parameter, the target variable and the control variable and to actuate the actuator depending on said manipulated variable,
    wherein a new value of the at least one parameter is determined depending on a stationary probability distribution of the control variable, and the at least one parameter is then set to this new value; and
    wherein the stationary probability distribution is a probability distribution towards which a probability distribution of the control variable converges during use of a control strategy of the actuator control system that depends on the at least one parameter.

2. The method of claim 1, wherein the stationary probability distribution is determined depending on a model, in particular on a Gaussian process, advantageously on a sparse Gaussian process, of the actuator.

3. The method according to claim 2, wherein the model is adapted depending on the manipulated variable, which is supplied to the actuator when the actuator is controlled using the actuator control system, and the resulting control variable, wherein, after the model is adapted, a new value of the at least one parameter is redetermined depending on the stationary probability distribution of the control variable of the actuator, wherein the redetermination of the new value of the at least one parameter is determined depending on the now adapted model.

4. The method according to claim 1, wherein the stationary probability distribution of the control variable is determined by an approximation of an integration using possible values of the control variable, wherein said approximation is carried out using numerical quadrature.

5. The method according to claim 4, wherein a density of support points is determined depending on a determined temporal evolution of the control variable, which evolution is in particular determined by means of the model and/or the actuator control system, proceeding from an initial value of the control variable that was randomly determined from an initial probability distribution.

6. The method according to claim 5, wherein the density of the support points is also determined depending on a determined temporal evolution of the control variable, which is in particular determined by means of the model and/or the actuator control system, proceeding from the predefined target variable as the initial value of the control variable.

7. The method according to claim 5, wherein a density of the support points is selected depending on a variable (Var) which characterizes a smoothness of the model at at least one value of the control variable in the determined temporal evolution(s) of the control variable.

8. The method according to claim 7, wherein the density of support points in a region is selected depending on a smallest value, wherein the smallest value is the smallest value of the variable which characterize a smoothness of the model at the values of the control variable which are in this range.

9. The method according to claim 8, wherein the density of support points is increased if a quotient of the average density of support points and the smallest value falls below a predefinable threshold value.

10. The method according to claim 5, wherein the density of the support points in a region can also be selected depending on an average density of the support points in said region.

11. The method according to claim 4, wherein a result of the numeric quadrature is determined depending on a dominant eigenvector of a matrix which is given by a product of a diagonal matrix of support weights with a transition matrix, wherein the components of the transition matrix each characterize a probability of a transition of the control variable from a first support point to a second support point.

12. The method according to claim 1, wherein a long-term cost function is selected depending on a local cost function, wherein the local cost function is selected depending on a Gaussian function and/or a polynomial function which is dependent on a difference between the manipulated variable and the predefined target value.

13. The method according to claim 1, wherein the manipulated variable is limited to values within a predefinable manipulated variable range by a limiting function.

14. A learning system for automatically setting the at least one parameter of the actuator control system which is designed to control the control variable of the actuator to the predefined target variable, wherein the learning system is designed to carry out the method according to claim 1.

15. The learning system according to claim 14, wherein the learning system is designed to
   determine the stationary probability distribution of the control variable by an approximation of an integration using possible values of the control variable, wherein said approximation is carried out using numerical quadrature, and
   determine, by means of a GPU, a result of the numeric quadrature depending on a dominant eigenvector of a matrix which is given by a product of a diagonal matrix of support weights with a transition matrix, wherein the components of the transition matrix each characterize a probability of a transition of the control variable from a first support point to a second support point.

16. A non-transitory machine-readable storage medium containing computer program instructions for carrying out the method of claim 1.

* * * * *